US008061295B2

(12) United States Patent
Zimmerman et al.

(10) Patent No.: US 8,061,295 B2
(45) Date of Patent: Nov. 22, 2011

(54) BEAD APPLICATOR

(75) Inventors: David Zimmerman, Jefferson, OH (US); Russell Francis, Chardon, OH (US); Michael Orlando, Chardon, OH (US); Ryan Vodicka, Mentor, OH (US)

(73) Assignee: Aexcel Corporation, Mentor, OH (US)

( * ) Notice: Subject to any disclaimer, the term of this patent is extended or adjusted under 35 U.S.C. 154(b) by 498 days.

(21) Appl. No.: 12/259,293

(22) Filed: Oct. 27, 2008

(65) Prior Publication Data

US 2009/0110813 A1 Apr. 30, 2009

Related U.S. Application Data

(60) Provisional application No. 60/982,588, filed on Oct. 25, 2007.

(51) Int. Cl.
*B05C 19/00* (2006.01)
*B05B 3/00* (2006.01)
*B65G 53/50* (2006.01)

(52) U.S. Cl. ......... 118/308; 118/323; 406/144; 406/122

(58) Field of Classification Search .................. 118/308, 118/321, 323; 406/39, 144, 122, 138, 153, 406/152; 427/137, 180; 401/2, 94; 239/654
See application file for complete search history.

(56) References Cited

U.S. PATENT DOCUMENTS 1,702,585 A 2/1929 Bell
1,999,563 A 11/1930 Glasgow
2,015,695 A 10/1935 Sapp
2,278,984 A 4/1942 Rodli et al.
2,317,288 A 4/1943 McCubbin
2,673,090 A 3/1954 Blumberg
2,691,923 A 10/1954 Huck
2,797,963 A 7/1957 Wilson
2,812,211 A 11/1957 Gardner
2,821,890 A 2/1958 Wilson
2,833,542 A 5/1958 Martin
3,057,273 A 10/1962 Wilson et al.
3,279,336 A 10/1966 Eaton et al.
3,286,605 A 11/1966 Wilson et al.
3,422,792 A 1/1969 Rollette
3,874,801 A 4/1975 White
3,964,835 A 6/1976 Eigenmann
4,856,931 A 8/1989 Bollag
4,953,792 A 9/1990 Evans
5,275,504 A 1/1994 Nonemaker
5,380,549 A 1/1995 Harvison
5,951,201 A 9/1999 Jones
6,290,428 B1 9/2001 Hall et al.
(Continued)

*Primary Examiner* — Yewebdar Tadesse
(74) *Attorney, Agent, or Firm* — D.A. Stauffer Patent Services

(57) ABSTRACT

A bead applicator for embedding particulates in wet paint, includes a blower directing air into an attached series of connected pipes; a particulate hopper, and a tubular particulate supply line connecting an outlet opening from the hopper to a venturi inlet opening at a low pressure point of a venturi tube. The series of connected pipes includes, in order, the venturi tube, a rigid tubular wand, and a dispensing nozzle. The wand, an inlet of the nozzle, and an outlet of the nozzle all have approximately the same, or greater, inside cross-sectional area relative to that of an outlet of the venturi tube; and the nozzle fans out to a long and narrow shaped outlet. Preferably a flexible hose is included in the series of connected pipes; the hose having approximately the same, or greater, inside cross-sectional area relative to that of the venturi tube outlet, and the nozzle outlet is bent over.

4 Claims, 4 Drawing Sheets

U.S. PATENT DOCUMENTS

| | | | | |
|---|---|---|---|---|
| 6,413,012 | B1 | 7/2002 | Jones | |
| 6,478,507 | B2 | 11/2002 | Schroeder et al. | |
| 6,547,158 | B1 | 4/2003 | Smith | |
| 7,073,974 | B2 | 7/2006 | Lichtblau | |
| 7,080,961 | B1 * | 7/2006 | Blatt | 406/39 |
| 7,106,836 | B2 | 9/2006 | Neuhaus | |

* cited by examiner

BEAD APPLICATOR

CROSS-REFERENCE TO RELATED APPLICATIONS

This application claims the benefit of U.S. Provisional Patent Application No. 60/982,588, filed Oct. 25, 2007 by Zimmerman, et al., said application hereby incorporated in its entirety by reference herein.

TECHNICAL FIELD OF THE INVENTION

The present invention relates to devices and methods for embedding particulate materials in traffic safety marking paint.

BACKGROUND OF THE INVENTION

Traffic safety markings on roadways (lane stripes, crosswalk lines, turn arrows, words and the like) are made with a special traffic safety paint that is very tough, durable and brightly colored for high visibility (e.g., white, bright yellow, etc.). Traffic safety markings may also be applied to vertical surfaces, such as highway barrier walls. The nighttime headlight-reflecting capability of the traffic safety paint can be greatly enhanced by embedding small glass spheres (retroreflective beads) in the surface of the paint. In some cases it may be desirable to increase the surface roughness of the paint by embedding an anti-skid agent, e.g., sand, grit. The present invention relates particularly to devices and methods for embedding glass beads, anti-skid agents, and the like in traffic safety markings, particularly limited area markings that cannot be done by a vehicle-mounted sprayer moving along the roadway, as in lane striping. For example, crosswalk lines, turn arrows, and words like "STOP" are limited area markings. Nevertheless, it should become apparent that the invention is also applicable for non-limited area markings wherein the inventive device is mounted on a vehicle.

Reflective and anti-skid traffic safety markings are generally applied in two steps: paint application, and then bead (or anti-skid agent or other particulate) embedding. For lane striping vehicles, the two steps can be performed in quick succession by mounting a particulate spray head behind, i.e., trailing, a paint spray head.

For the sake of clear and focused description, the present disclosure is primarily focused on apparatus and related method for applying (embedding) retroreflective glass beads to wet paint, since this is the most problematic type of particulate to apply due to the characteristics of tiny glass beads. Given the present disclosure, it should be apparent to engineers of ordinary skill how to adapt the disclosed glass bead application apparatus and method embodiment(s) to be used for spraying other particulates, like sand for skid resistance, into paint like the traffic safety marking paint discussed herein.

The limited area safety marking is typically conducted as follows. For paint application, the area is preferably swept or blown clear of dust and debris, and then paint is hand sprayed or poured into stencils for non-linear area markings such as lettering and arrows. The paint is fast drying, and depending upon the type of paint, may be anywhere from about 10 mil to about 100 mil thick (1 mil=0.001 inches). For example, a quick-hardening material sold by the inventors' company includes a liquid pigmented paint and a powdered catalyst that are mixed on site for immediate use, since the mixture becomes totally hardened in about 20 minutes. The catalyzed mixture is poured into a stencil laid on the pavement, and is spread/leveled with a squeegee blade wide enough to span the stencil's openings. The paint layer resulting from such stenciling is generally about 100 mil thick (0.1 inches).

The reflective beads (or other particulates) are applied to the wet paint before it hardens. The beads can be scattered by hand like sowing grass seed, but preferably a hand-held spray gun wand drops (gravity fed) or shoots (air blown) beads down into the wet paint. Since hand-scattered application methods result in extremely uneven and wasteful bead distribution (glass beads are relatively expensive), the best bead application method is the air-blown method. Also, both gravity dropped and hand strewn beads do not impinge on the paint with sufficient force to embed the beads very deep. For good wear resistance, the beads must be embedded as deeply as possible while still leaving a portion exposed for light reflection. Having some beads more deeply embedded provides continued reflective properties even after the paint has been worn down enough to dislodge the top layer of beads.

Known prior art air-blown applicator equipment uses an air compressor to force beads out of an airtight hopper ("pot") and through a hose to a nozzle that is typically small and round and therefore emits a relatively narrow, outward spreading, cone shaped spray of beads. The narrow cone yields a non-uniform bead and embedding force distribution as the spray nozzle is moved and tilted; furthermore the narrow application swath causes striations like corn rows when the nozzle must take several passes to cover a wide area. The bead pot is pressurized by an air compressor line, and the pot outlet goes into a flexible hose leading to the spray nozzle. For manual spraying, a hand held wand (rigid section of tubing) is employed between hose and nozzle to enable the user to control the nozzle position near the ground while standing.

There are a number of problems with the prior art air-blown devices.

1. Air compressors are heavy and bulky and thus are generally mounted on a wheeled carrier for limited area painting. They are also relatively expensive, and difficult to transport to a work site.
2. Air compressors compact ambient air which may be humid, thereby greatly increasing the amount of water contained in a stream of air output from the compressor. Sometimes the compressor may also leak lubricating oil into the output stream. Condensed water and/or oil vapor causes what is known as "packing" or clumping of the beads in the pot, periodically slowing or even stopping the flow of beads until the clumps can be broken up, and/or removed and thrown away (costing both time and money).
3. The prior art compressor driven devices and nozzles are known for producing striations, patchiness, uneven embedding depth, and other such non-uniformities of bead distribution in and on the paint, which translate into non-uniform light reflection and uneven wearing over time.
4. Prior art applicator hoses often suffer from a buildup of static electricity due to glass bead friction against the rubber/plastic hose interior. This can cause problems of static discharge shock to a user, and/or static electric effects on bead distribution.

Therefore it is an object of the present invention to address these problems to provide a relatively inexpensive and light weight bead (particulate) applicator that embeds the particulates in a painted surface with a maximum of uniformity and a minimum of waste and time/effort. Preferably these objectives are met not only for wheeled cart-type line stripers, but also in usage that requires hand holding of the applicator outlet.

BRIEF SUMMARY OF THE INVENTION

According to the invention a bead applicator for embedding particulates in wet paint is disclosed, the bead applicator comprising: a blower directing air into an attached series of connected pipes; and a particulate hopper, and a tubular particulate supply line connecting an outlet opening from the hopper to a venturi inlet opening at a low pressure point of a venturi tube; wherein the series of connected pipes comprises, in order: the venturi tube; a rigid tubular wand; and a dispensing nozzle; wherein the wand, an inlet of the nozzle, and an outlet of the nozzle all have approximately the same, or greater, inside cross-sectional area relative to that of an outlet of the venturi tube; and the nozzle fans out to a long and narrow shaped outlet.

According to the invention the bead applicator further comprises a flexible hose included in the series of connected pipes; the hose having approximately the same, or greater, inside cross-sectional area relative to that of the venturi tube outlet.

According to the invention the bead applicator further comprises a portion of the wand or nozzle that is rotatable about the axis of the nozzle inlet; and a bend at the nozzle outlet to an outlet angle such that the outlet is directed substantially perpendicular to a painted surface when the bead applicator is in use, and such that the nozzle can be turned to blow substantially tangentially to the painted surface. Preferably the nozzle outlet angle is about 30 degrees relative to the axis of the nozzle inlet.

According to the invention the bead applicator further comprises a particulate flow controller built into the particulate supply line.

According to the invention the bead applicator further comprises any of the following:

- a flow controller selected from the group consisting of: a variable size orifice, a needle valve, a shutoff valve, and any combination thereof.
- a flow controller being an enclosed auger, the auger being driven by an electrical or pneumatic flow control operator, and controlled by a manual switch.
- optionally the auger is variable speed including stopped.
- flow control operator is electric, powered by a rechargeable battery.
- a solar panel for recharging the battery and/or for operating the flow controller.
- the nozzle contains a baffle such that the baffle divides the air stream into two streams separated by a gap.
- a blower that can be easily detached to use as a hand-held debris cleaner.
- a blower engine speed control (throttle) to allow variable bead-embedding force, and therefore embedding depth.
- mounting structures including a wheeled cart, a hand carried fixed structure, or a shoulder strap/backpack with a flexible hose.
- on the cart: a wand attachment arm that has a swivel with lock such that wand can be swiveled to raise the nozzle to a selected height and locked in place, thereby enabling bead application on a raised painted surface including vertical wall surfaces.
- on the cart: a wand attachment arm that has a quick-disconnect clamp such that the wand is removable for hand-held use.
- for a hand, shoulder or back-carried embodiment: the blower, the venturi tube and the hopper are assembled in a fixed structure. Optionally the wand with nozzle is attached to the venturi tube outlet to form a rigid linear fixed structure without a flexible hose.
- a discharge wire in the hose/tubing to prevent static buildup
- a filter in the hopper.
- a hopper pressurizing line from the venturi tube before the venturi restriction.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199*a*, 199*b*, 199*c*, etc. Or, related but modified elements may have the same number but are distinguished by primes. For example, 109, 109', and 109" are three different elements which are similar or related in some way, but have significant modifications. Such relationships, if any, between similar elements in the same or different figures will become apparent throughout the specification, including, if applicable, in the claims and abstract.

Figure 1:
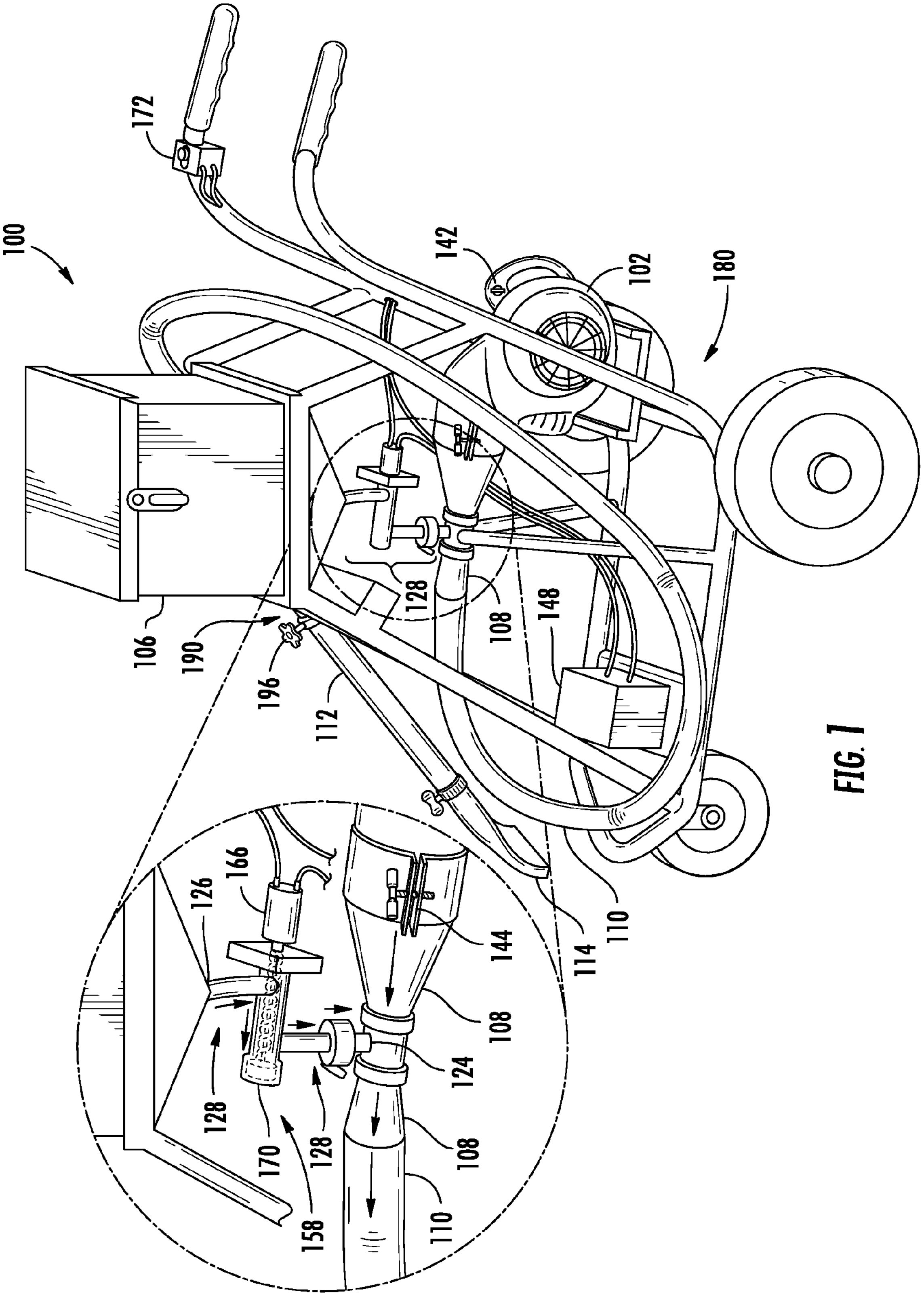

The structure, operation, and advantages of the present preferred embodiment of the invention will become further apparent upon consideration of the following description taken in conjunction with the accompanying drawings, wherein:

FIG. 1 is a perspective view of a preferred embodiment of a bead applicator mounted on a wheeled cart, according to the invention.

Figure 2A:
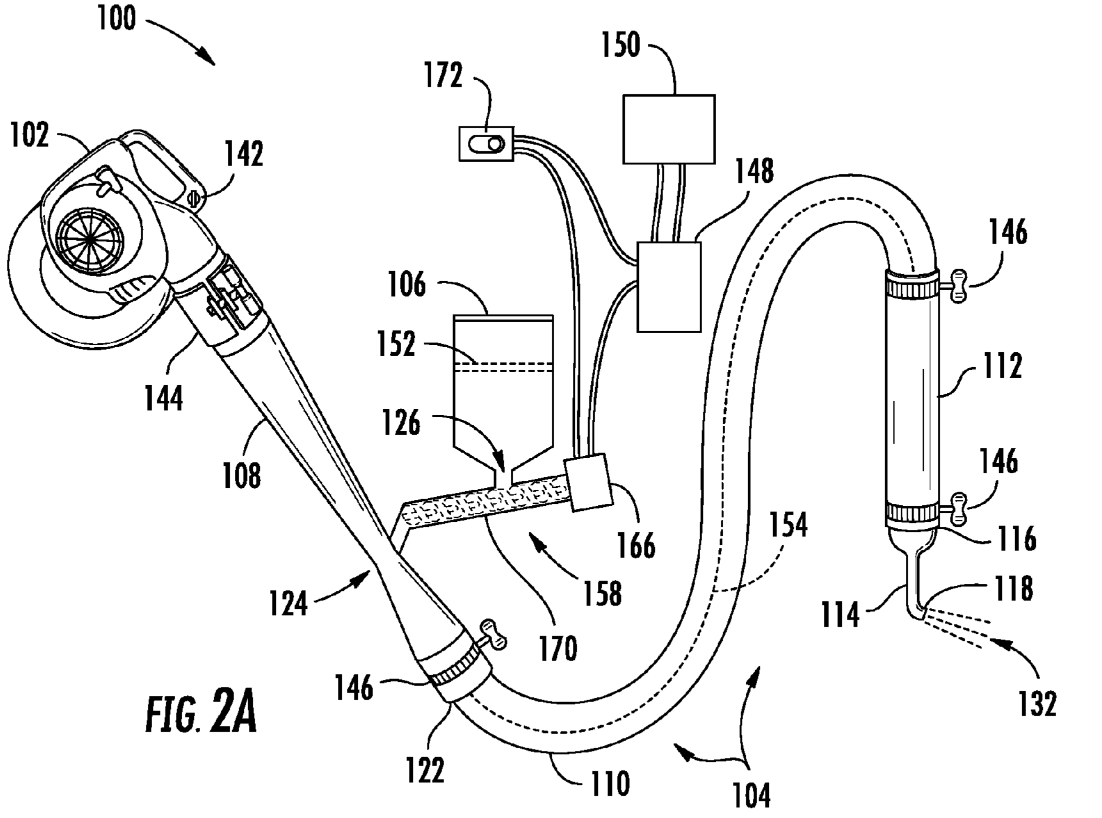
Figure 2B:
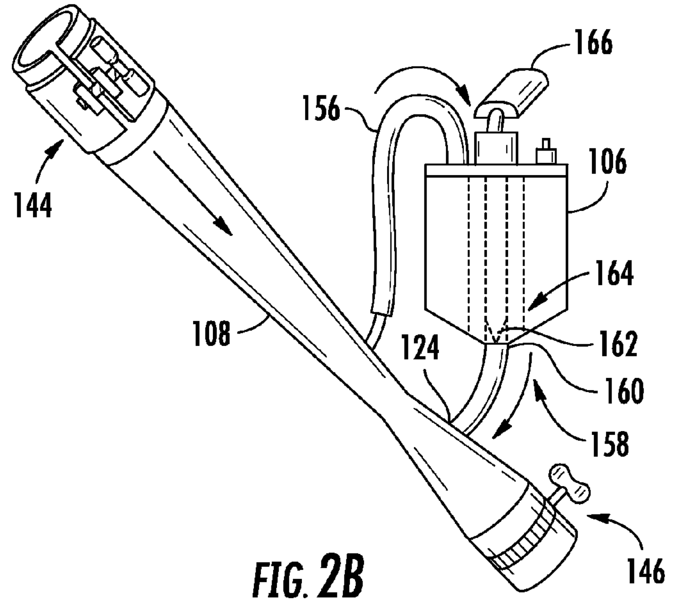

FIGS. 2A-2B are schematic views of portions of the bead applicator using different bead flow control methods, according to the invention.

Figure 3:
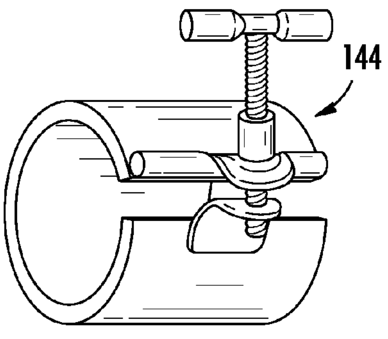

FIG. 3 is a perspective view of a quick-disconnect clamp, according to the invention.

Figure 4A:
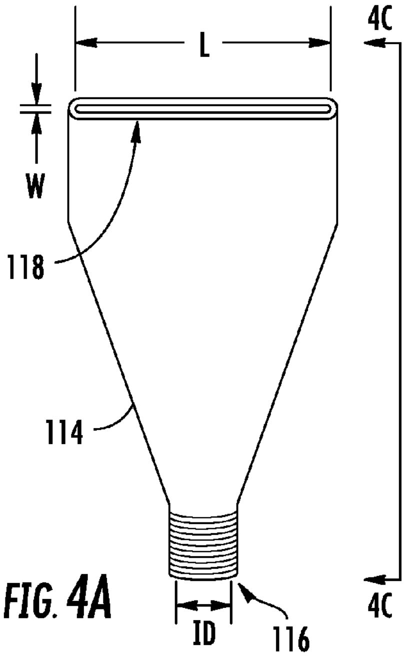
Figure 4B:
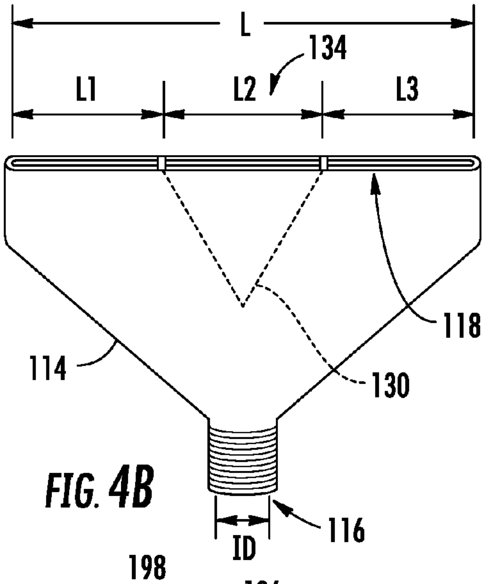
Figure 4C:
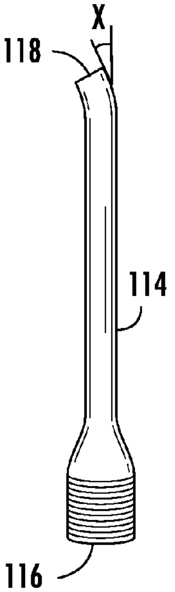

FIGS. 4A-4C are side views of two bead spray nozzles according to the invention, FIG. 4C being a rotated side view of either of the nozzles in FIGS. 4A and 4B, the rotated edge view taken along the line 4C-4C in FIG. 4A.

Figure 5:
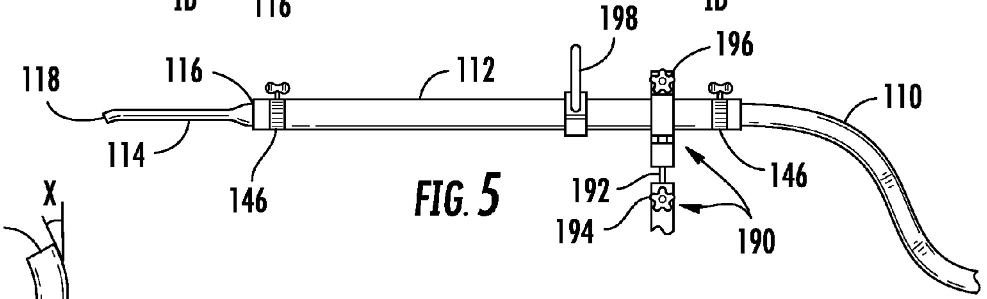

FIG. 5 is a top view of a hose/wand/nozzle assembly, according to the invention.

Figure 6A:
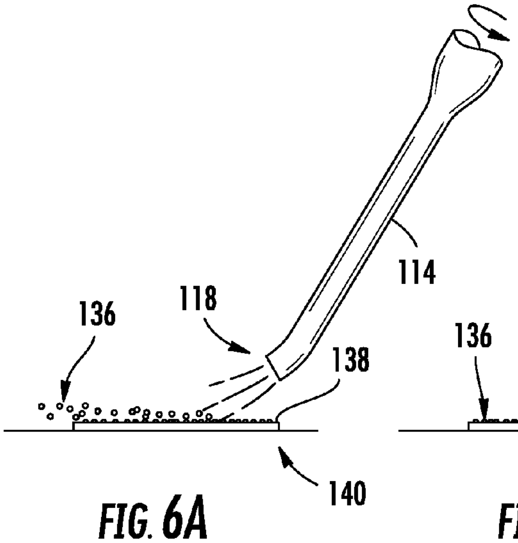
Figure 6B:
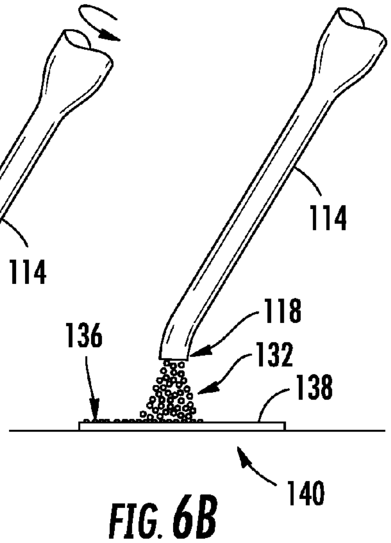

FIGS. 6A-6B are side views of exemplary uses of the nozzles, according to the invention.

Figure 7:
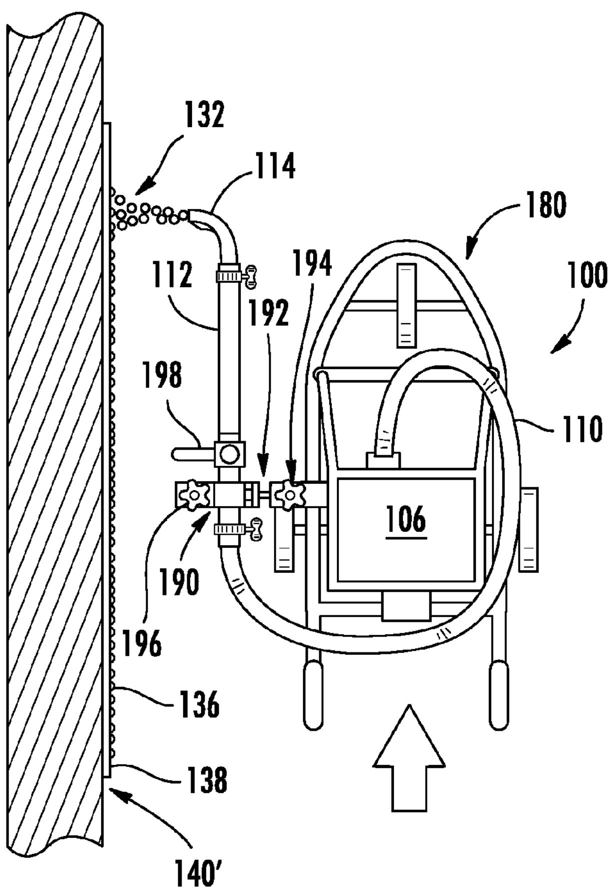

FIG. 7 is a top plan view of the bead applicator on a cart being used for bead application on a vertical wall, according to the invention.

Figure 8:
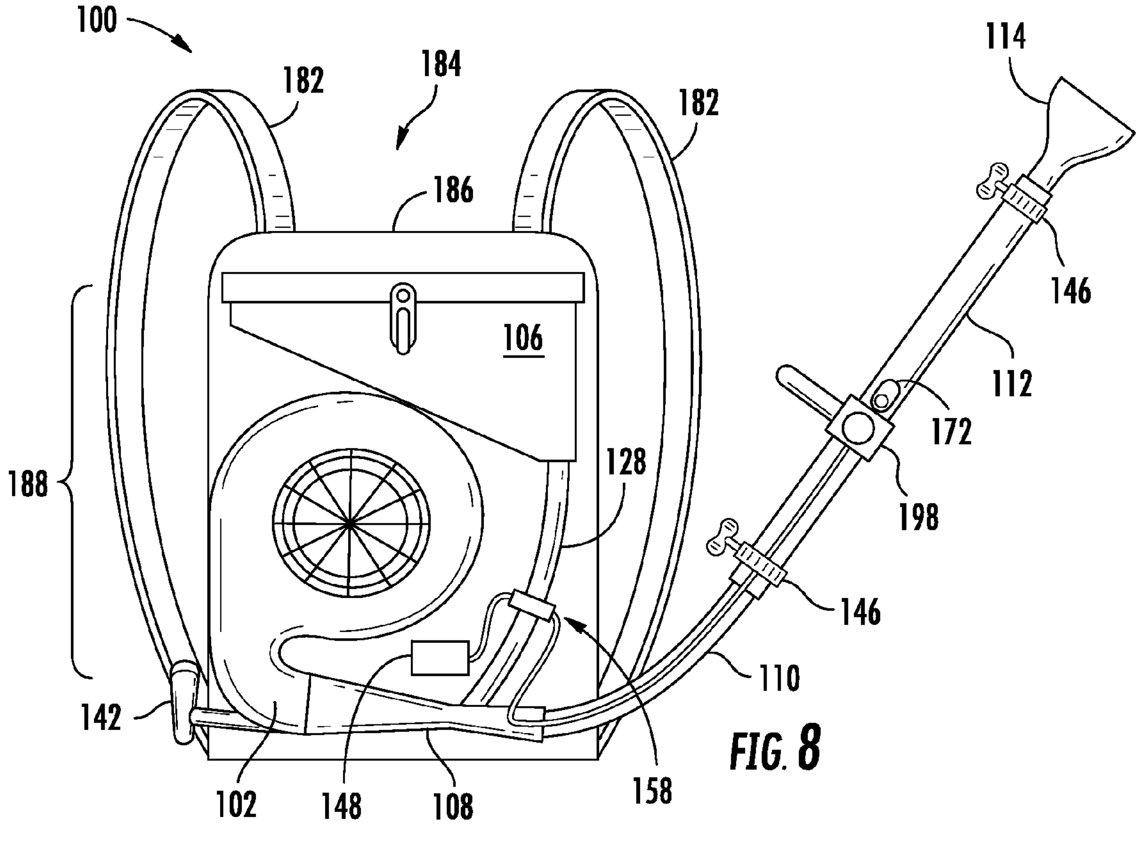

FIG. 8 is a side view of a backpack implementation of the bead applicator, according to the invention.

DETAILED DESCRIPTION OF THE INVENTION

For the sake of clear and focused description, the present disclosure is primarily discussed and illustrated with exemplary embodiments of a "bead applicator", i.e., apparatus and related method for applying (embedding) retroreflective glass beads to wet paint, since this is the most problematic type of particulate to apply due to the characteristics of tiny glass beads (e.g., static electric generation and clinging, e.g., clump formation due to liquid contaminants). Given the present disclosure, it should be apparent to engineers of ordinary skill how to adapt the disclosed glass bead application apparatus and method embodiment(s) such that they can be used for spraying other particulates, like sand for skid resistance, into wet paint like the traffic safety marking paint discussed herein. Therefore, any reference herein to "beads" should be understood to apply more generally to all "particulates" of similar size and/or flow characteristics unless specifically stated otherwise. Likewise, any use herein of the term "particulate" should be understood as a reference to glass beads, and that the alternate term is being used to emphasize the generic applicability of the term "beads" to all similar particulates. Even further, the teaching herein regarding "small" or even "tiny" beads and/or particulates is not intended to be exclusively limited to such small particulates. No doubt the teachings herein can be adapted by persons of ordinary skill in the relevant art such that they can be applied to similar handling of a broader range of particulate types and sizes. For example, the inventors have determined that sand can be applied to wet paint using substantially the same apparatus and methods as are used for bead application, even though sand grains used to provide non-slip characteristics to paint are typically significantly larger than the glass beads used for providing reflective properties. It should be uninventively simple to predict and/or determine practical particle size limits without undue experimentation.

The exemplary embodiments of the invention that are described herein are particularly suited for bead embedding in a non-linear area of paint. Such is the most difficult usage for the inventive bead applicator because a fixed application nozzle on a line striping cart is inadequate for such an area; a wheeled cart cannot be rolled on the wet paint, so at least the spray end of the bead applicator must be hand held. However, a wheeled striping machine is typically used for painting crosswalk stripes. So an objective, met by the present invention, is to produce apparatus and method that is flexible enough to handle both types of bead application.

An important feature of the present invention is replacement of an air compressor with a blower that is much lighter and less expensive. A working prototype was first constructed using a simple leaf blower (gas powered) mounted on a wheeled cart. It will be seen that, like a leaf blower, the inventive bead applicator can also be hand carried and/or supported by a shoulder strap (or two, like a backpack). Although less preferred, it can also be mounted on a roadway line painting vehicle. Given the teachings herein, a device design engineer of ordinary skill should be able to optimize the design using light-weight materials arranged in a compact package. For example, most parts could be made of plastic, especially since only low pressure air is used.

The inventive bead applicator takes advantage of differences between a blower and an air compressor to provide an applicator wherein the output bead stream is easily adjusted, while in use, to vary the density and momentum (embedding force) of the bead stream, and the bead stream can be fanned out to apply a broad band of beads that is relatively uniform in density and momentum along the length of the band. Other advantages and features of the invention should become apparent through reading of the present disclosure.

FIG. 1 shows a preferred embodiment of the inventive bead applicator 100 mounted on a wheeled cart 180. A three wheeled cart 180, with a swiveling (caster) front wheel and conveniently positioned push handles has been adapted to provide a suitable framework for mounting the applicator 100 in a way that it can be flexibly used for bead (particle) application to a linear stripe of paint 138 as well as to broader area of paint 138 that requires hand-held bead 136 application.

The illustrated parts of the bead applicator 100 include a blower 102 with its fan's air outlet held (e.g., using clamp collar 144) in line with a venturi tube 108 that is supported by portions of the structural framework of the cart 180. The venturi tube 108 is attached in line with a flexible hose 110, which in turn leads to an in-line connection (not shown in this Figure) to a rigid tubular "wand" 112 with a bead spray nozzle 114 at its outlet end. The wand 112 (and thus the hose 110 and the nozzle 114 connected to it) is held to the cart 180 by a wand attachment arm 190 described in more detail hereinbelow. The bead applicator 100 further includes a bead supply hopper 106, preferably mounted above the venturi tube 108, and a particulate supply line 128 that leads from the hopper 106 to the venturi tube 108.

A flow controller 158 is connected in line with the supply line 128 to control the flow rate of beads 136 through the bead supply line 128, from a hopper outlet 126, preferably but not necessarily emerging from a lowest point of a sloped bottom of the hopper 106. The supply line 128 leads to a venturi inlet 124 at a necked-in venturi portion of the venturi tube 108. It will be seen that the flow controller 158 can be implemented with a variety of suitable devices, but a preferred embodiment of the flow controller 158 is illustrated as an enclosed auger 170 that is turned by a small electric motor type of flow control operator 166. Beads 136 fall from the hopper 106 into an inlet of the auger 170. If the motor 166 is turning, then the auger 170 will screwingly convey the beads 136 to an auger outlet from whence the beads 136 can fall and/or be drawn into the venturi tube 108. Preferably the flow control operator 166 is easily controlled by a user of the bead applicator 100 to vary in rotation speed from zero to a reasonable maximum rate, thus controlling the flow rate of beads 136 through the applicator 100. Obviously, when the operator 166 is stopped, then bead flow will be shut off, regardless of the air flow from the blower 102. The illustrated electric motor operator 166 meets these objectives by having power supplied by an electric battery 148 type of power supply, and controlled by a manual switch 172 conveniently mounted on the cart handle. Preferably the motor 166 is variable speed and is controlled by a manual rheostat control built into the switch 172. Another suitable flow control operator 166 is, for example, an air driven motor 166 using a pressurized gas cylinder (e.g., air, $CO_2$) as its power supply 148, and manually controlled by a pneumatic switch 172 that may also include a manual control of pneumatic power flow (analogous to electrical current).

Although a custom-made blower 102 could be used, expense is greatly reduced, and convenience increased, by using a commercially available leaf blower 102, conveniently with a gas engine. Such a blower 102 has a handle and a blower speed control 142 (engine throttle) that is preferably variable. The clamp 144 holding the blower 102 and the venturi tube 108 together is a quick-disconnect type of clamp, so the blower 102 is easily detached and hand held to enable quick post- and pre-bead-application cleaning of the application area (e.g., blowing away debris before painting the surface, and blowing away loose particulates 136 after use of the bead applicator 100). Alternatively, the clamp 144 could be omitted and the blower 102 outlet held in place by a friction fit within a sleeve-like inlet to the venturi tube 108. The blower 102 could also be supported by some kind of shelf built into the framework of the cart 180.

The illustrated cart 180 implementation of the bead applicator 100 is configured for use either in linear bead application with the nozzle 114 fixed on the cart 180 while it is pushed along a line, or in limited area bead application with a hand-held long rigid tubular wand 112 and a long flexible hose 110, both being removably stored on the cart 180. However, it should be apparent that the inventive bead applicator 100 could be simplified if dedicated solely for use with the cart 180. For example, a short rigid pipe (tube) could extend directly from the venturi tube outlet 122 to a fixed, downward-aimed nozzle 114.

FIG. 2A presents an overall schematic of a first embodiment of the inventive bead applicator 100 shown independent of a wheeled cart 180 or other supporting structure. In general, a venturi tube 108 and a relatively large diameter flexible bead spraying hose 110 are employed to enable the relatively low pressure airstream output by a common blower 102 to spray beads 136 out of a detachable nozzle 114 at the end of the bead spraying hose 110. A series of connected pipes 104 conducts the air flow from the blower 102, through a venturi tube 108, through a flexible hose 110, through a rigid tubular wand 112 and out through a nozzle 114. As mentioned above, the hose 110 and wand 112 are optional as far as basic functionality of the bead applicator 100 is concerned, but are advantageous in some embodiments of the invention.

The bead applicator embodiment of FIG. 2A is constructed as follows. An air outlet of a gas engine powered blower 102 with a variable speed control 142 is detachably connected in line with the venturi tube 108, for example using a quick-release sleeve clamp 144 such as shown in FIG. 3. An outlet 122 of the venturi tube 108 is connected (e.g., by a hose clamp 146) to the series of connected pipes 104 leading to the nozzle 114.

The venturi tube 108 is an induction system that creates a low pressure (sub-atmospheric) region at a venturi restriction and this is used to draw beads 136 from the bead hopper 106 through the venturi inlet 124 and into the airstream passing through the venturi (restriction). A flow controller 158 meters the bead flow rate such that the beads 136 are entrained in the airstream in a density that doesn't clog in the relatively large inside diameter (e.g., nominally one inch) of the series of connected pipes 104. (Bead flow rate also helps determine density of the beads 136 embedded in the paint 138.) Clogging is further prevented by constructing the nozzle 114, particularly, and the series of connected pipes 104, generally, in a way that avoids or at least minimizes backpressure, as further explained hereinbelow. Comparable prior art devices must use high pressure air in order to push beads 136 at the same rate through a smaller ID passageway, which therefore produces a high density, narrow bead stream 132. To address the problems caused by backpressure, some prior art devices use a vent and special valves, adding complexity which isn't needed here.

As beads 136 leave the hopper 106, ambient air is drawn in. As a precaution against contamination of the bead supply, a moisture and/or dust filter 152 is advantageously placed above the beads 136 in the hopper 106.

The flow control operator 166 is an electric motor powered by a battery 148 and controlled by a manual switch 172. The battery is preferably rechargeable, and is optionally re-charged by a solar panel 150, which could alternatively power the flow control operator 166 directly, at least on sunny days. In this embodiment, bead flow rate is determined by the rotation speed of the auger type of flow controller 158, which is turned on/off as a shutoff valve by the manual switch 172, and optionally is speed-varied by a manual rheostat control. Thus, this embodiment allows excellent control over bead flow.

The venturi inlet 124 is located at the venturi restriction, where the beads 136 become entrained in the venturi tube 108 airstream (from the blower 102). The venturi restriction induces a low pressure, thereby aspirating the beads 136 through the venturi inlet 124, whereupon they are easily entrained throughout the airstream because the air flow is fastest and at its smallest cross sectional area at the venturi restriction. Having been evenly distributed throughout the cross-sectional area of the airstream at the restriction, the entrained beads 136 remain substantially uniformly distributed as the airstream widens with the venturi tube 108 that opens out to a larger cross-sectional area at the outlet 122 of the venturi tube 108.

To prevent static buildup caused by bead friction along the length of the bead spraying hose 110, the hose 110 contains a static discharge wire 154 connected to a ground, allowing friction-generated static buildup to harmlessly disperse.

FIG. 2B shows an alternate embodiment of a portion of the bead applicator 100, showing a bead hopper 106, a venturi tube 108, and a bead flow controller 158. A hopper "pressurizing" line 156 is optionally added to give an extra pressurized boost to the flow of beads 136 out of the bead hopper 106. The hopper pressurizing line 156 directs air from a hopper pressure port located in a higher pressure region of the venturi tube 108, just before the venturi restriction, to an inlet of the bead hopper 106. Obviously, if the hopper pressurizing line 156 is utilized, then the hopper 106 must be relatively airtight. It should be noted that this arrangement is not at all like the prior art arrangement with its consequent problems of bead packing in the "pressure pot" type of bead supply hopper 106. The inventive hopper pressurizing line 156 (if used) directs only a small fraction of the air flow into the hopper 106, and that air is at a pressure only slightly above ambient pressure. Therefore the air is not concentrated enough to cause water condensation problems, and neither is there enough pressurizing air flow to carry in a significant amount of humid air. Furthermore there will not be any oil vapor in the blower 102's air output, either.

The hopper 106 has a bottom surface sloped down toward an exit orifice 162. An orifice plate 160 with a circular metering orifice dimensioned to allow passage of beads 136 at a predetermined rate meters the beads 136 through to the venturi inlet 124, thereby serving as the flow controller 158. A needle 162 can be moved up and down within the orifice 160 (e.g., by a hand control knob type of flow control "operator" 166), thereby regulating the flow rate like a needle valve flow controller 158. If pushed all the way down, the needle 162 and the orifice 160, become effectively a bead flow shutoff valve 164.

FIGS. 4A-4C show details of two nozzles 114 according to the invention, FIG. 4C being a side view of either of the nozzles 114 in FIGS. 4A and 4B. FIG. 5 shows a hose 110/wand 112/nozzle 114 assembly, and FIGS. 6A-6B illustrate exemplary uses of the nozzles 114.

FIG. 4A shows a nozzle 114 for all-purpose bead application. The all-purpose nozzle 114 has an outlet opening 118 that is narrow enough (e.g., a width W of approximately 3/16") to produce a fine spray of beads 136, is elongated enough (e.g., a length L of approximately 6", i.e., much greater than width W) to produce a broad (long) fan-spray for efficient and uniform bead application to a large area of paint 138, and is sized to at least approximately match the cross-sectional area of the nozzle inlet 116 (e.g., round with an inside diameter ID of nominally 1"). Furthermore, as stated above, the series of connected pipes 104 after the venturi tube 108 (e.g., the hose 110, wand 112 and nozzle 114) is dimensioned such that it has no less than approximately the same cross-sectional area as the cross-sectional area of the venturi tube outlet 122 (e.g., round with an inside diameter of nominally 1"). Of course minor restrictions to a smaller ID for a short distance can be tolerated, thus the "approximate" and "nominal" modifiers used in the preceding statement.

As an example, a successful prototype was constructed with round cross-sections for the venturi tube 108, the hose 110, the wand 112, the nozzle inlet 116 and all inlets, outlets and connections therebetween. The minimum cross-sectional area for this series of connected pipes 104 had an inside diameter of about 1" (inch), which calculates to 0.785 sq. in. (square inches). The nozzle outlet 118 for the "all-purpose" nozzle 114 illustrated in FIGS. 4A and 4C had a width W of 3⁄16 inches, and a length L of 6 inches (measured inside the outlet opening), yielding a cross-sectional area of about 6×0.1875=1.125 sq. in. which is significantly larger than the cross-sectional area leading to the outlet 118. In order to avoid slowing down bead flow rate/momentum and/or decreasing the bead density in the output bead stream 132, the nozzle outlet 118 cross sectional area can be reduced to be closer to that of the nozzle inlet 116. For example, the area is matched if the width W is reduced to ⅛ inch and the length L is stretched to at least 6.28 inches. For example, the area is matched if the width W is kept at 3⁄16 inch and the length L is reduced to about 4.2 inches.

FIG. 4B shows a specialized nozzle 114 that contains a dividing baffle 130 placed such that the air/bead mixture exiting the nozzle 114 is divided into two streams of length L1 and L3 separated by a gap 134 having a length L2. This allows for convenient bead application to two parallel stripes of paint 138, e.g. lane dividing lines that separate opposing streams of traffic. The dimension guidelines stated above still apply, but the effective length of the outlet 118 would now be the sum of lengths L1 and L3.

Although only two detachable nozzles 114 are shown, it should be understood that the inventive device can accommodate other nozzles 114, and that these nozzles 114 are intended to be within the scope of the invention, particularly if they also provide an outlet 118 cross-sectional area that is no less than approximately equal to the minimum cross-sectional area of the series of pipes 104 back to the outlet 122 of the venturi tube 108.

The wand 112, made of rigid PVC tubing, is long enough to allow a user to hold the top end of the wand 112 while positioning the nozzle 114 opening close to the paint 138 on painted surface 140 (e.g., the ground or pavement), preferably out away from the user who would be standing on the surface 140 beside the painted area 138. A convenient angle for the wand 112 relative to the painted surface 140 is about 60 degrees. Therefore the outlet 118 end of the nozzle 114 is bent to an angle "X" (see FIG. 4C) of about 30 degrees relative to the axis of the nozzle inlet 116, thereby directing the spray of beads 136 substantially straight downward into the paint 138 when the wand 112 is held at a 60 degree angle to the painted surface 140 (e.g., the ground or pavement) as shown in FIG. 6B (assuming that the wand 112 is aligned with the axis of the nozzle 114). This assures maximum effectiveness in embedding the beads 136 into the paint 138 layer. A subsidiary advantage of the inventive device is illustrated in FIG. 6A. After bead application, excess un-embedded beads 136 must be swept away since they are very slippery. The inventive bead applicator 100 can be used as an air blower 102 by simply shutting off the flow of beads 136 using the flow controller 158, and then the air stream can be directed substantially tangential to the ground by simply turning over the nozzle 114 as shown (axially rotating the nozzle 114 and/or the wand 112 a half turn). This arrangement can also be used to blow clean an area before paint 138 application. Alternatively, the blower 102 itself can be unclamped 144 from the venturi tube 108 and used like a conventional leaf blower 102, albeit without a concentrating nozzle 114.

FIG. 5 shows some convenient attachments to the wand 112, according to the invention. A handle 198 is clamped on to make hand-held bead application more ergonomic and more controllable than attempting to grip the relatively large diameter wand 112 itself. The handle 198 may include a knob as well as a rod (see FIG. 8) for two-handed holding.

A wand 112 attachment arm 190 is optionally used to adjustably hold and position the wand 112 relative to a cart 180 (or even a vehicle) as shown in FIG. 7. The wand 112 attachment arm 190 extends sideways from a side of the cart 180, preferably up about waist high off the ground. A quick-disconnect clamp 196 detachably holds a hinged part of the arm 190 wrapped around the wand 112. This makes it easy to remove the wand 112 from the cart 180 so that it can be used as a hand-held applicator 100. A swivel 192 enables adjustment of the nozzle 114 elevation by swiveling the wand 112, and a set-screw with a knob serves as a swivel lock 194. This is just a simple example of a design for an adjustable, detachable attachment arm 190.

The nozzle 114 can be directed at a vertical surface 140' for bead application, as shown in FIG. 7 which illustrates bead application to an extended horizontal stripe of paint 138 on a barrier wall 140'. Although the bead applicator 100 could be used with the wand 112 being hand held, an advantageous embodiment of the invention on a wheeled cart 180 is shown wherein the adjustable detachable wand attachment arm 190 holds the wand 112 in a selectable fixed position at the side of the cart 180. FIG. 1 showed the wand 112 held such that the nozzle 114 is directed downward for application as shown in FIG. 6B for paint 138 on the ground, floor, roadway, and other such horizontal surfaces 140. FIG. 7 shows a comparable cart 180 wherein the nozzle 114 and/or wand 112 has been rotated about its longitudinal axis a quarter turn to spray sideways, and the wand attachment arm 190 has been adjusted to position the nozzle 114 at a desired height and with a spray direction that is substantially perpendicular to the painted surface 140' and to the path of the cart 180 when it is pushed straight ahead, in a direction parallel to the wall 140'. Thus the bead applicator 100 capabilities illustrated in FIGS. 6A and 6B can be equally well utilized for vertical surfaces 140' as well as horizontal surfaces 140. The wheeled cart 180 also enables the simplified and well-controlled striping capabilities of the invention 100 to be implemented on both horizontal and vertical surfaces 140, 140' at a variety of elevations relative to the floor supporting the cart 180. For example, an elevated horizontal surface 140 could be the top of a curb parallel to the street. Of course, "vertical" surfaces that are actually at a variety of angles relative to the ground are just as easily accommodated by simply rotating the nozzle 114 (and/or wand 112) to direct the bead flow normal to the painted surface 140'.

FIG. 8 illustrates a backpack 184 embodiment of the inventive bead applicator 100. Two shoulder straps 182 hold a backboard 186 for carrying on a person's back, or even slung over one shoulder. The backboard 186 is an example of a way to combine the basic elements of the applicator 100 as a fixed structure 188 that is compact and lightweight for person-carried use similar to back-carried gas engine-powered leaf blowers. Fixedly mounted on the backboard 186 is a blower 102 connected in line to a venturi tube 108 that leads to a flexible hose 110. The bead supply hopper 106 with a latched lid is on top, and a bead supply line 128 extends down from it to the venturi tube 108. The flexible hose 110 extends from the backboard 186 a short distance to the wand 112, and is hose-clamped 146 on it. The bead spray nozzle 114 is hose-clamped 146 to the other end of the wand 112. As with leaf blowers, a convenient handle 198 is attached to the wand 112 for two handed-control: e.g., a knob on top to grip with the right hand, and a rod extending sideways to be held by the left hand. A rectangle in the middle of the bead supply line 128 represents, for example, a solenoid shutoff valve type of flow controller 158 that is powered by a battery 148 (e.g., a couple of D-cell batteries in a case), and controlled by a slide switch 172 mounted on the wand 112 at the handle 198. An electric cable runs along the wand 112 and hose 110 to electrically connect the switch 172 to the solenoidal flow controller 158. A control lever protrudes from the left side of the board as a throttle 142 to control blower 102 engine speed and thus air flow rate.

It can be seen that, as with leaf blowers, an obvious variant of the backpack 184 embodiment of the invention would be even further simplification and weight management of the fixed structure 188 such that a shoulder-slung, or even completely hand-held version could be made. For example, the series of connected pipes 104 can be a single rigid linear assembly of the blower 102, venturi tube 108, wand 112 and nozzle 114, without the flexible tube 110. The fixed structure 188 could be completed by attaching the hopper 106 preferably, but not necessarily, above the venturi tube 108 by way of a bracket or a small backboard 186. A flow controller 158 and battery, if either are present, could also be attached to the blower 102, the hopper 106, the venturi tube 108, and/or a backboard 186 or bracket; or it could simply hang on the bead supply line 128.

An advantage of the present invention lies in the simple means of air flow control that is possible when a blower 102 is used rather than a compressor. The blower's fan speed is easily regulated by a throttle 142 or the like on the motor driving the blower fan. For a given series of pipes 104 construction, the blower 112 fan speed substantially determines the output air flow rate and thus the velocity and momentum of the particulates 136 entrained in the output air stream, which in turn proportionally affects the embedding force and therefore embedding depth of the particulates 136 in the wet paint 138. A higher speed means a higher momentum which therefore requires more resistance force from the paint 138 to stop the bead 136. Thus the depth of bead/particulate 136 embedding can be controlled by varying the blower 102 motor speed.

The result of the inventive equipment design is a more-easily controlled bead stream 132 out of the nozzle 114 when compared to that of the prior art equipment. Testing so far has shown a much more uniform distribution of beads 136 embedded in the paint 138 by the inventive bead applicator 100. The prior art compressor-driven devices are known for producing striations, patchiness, and other such non-uniformities which translate into non-uniform light reflection.

Although use of a blower 102 presents the greatest advantages, especially for manual application in limited area marking, a different embodiment of the invention includes essentially everything except a blower 102. In this case, the air flow supply to the venturi tube 108 could be anything, including a reduced pressure, filtered, bleed-off portion of a compressor's output. This may be desired for vehicle-mounted lane striping equipment, in which case a compressor is already being used to spray the paint 138.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention as claimed are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A bead applicator for embedding particulates in wet paint, comprising:

a blower directing air into an attached series of connected pipes; and a particulate hopper, and a tubular particulate supply line connecting an outlet opening from the particulate hopper to a venturi inlet opening at a low pressure point of a venturi tube;

wherein the series of connected pipes comprises, in order:

the venturi tube;

a wand that is rigid and tubular; and a dispensing nozzle having a nozzle inlet and a nozzle outlet;

wherein the wand, the nozzle inlet, and the nozzle outlet all have approximately the same, or greater, inside cross-sectional area relative to that of a venturi tube outlet; and the dispensing nozzle fans out to a long and narrow shape for the nozzle outlet;

the bead applicator further comprising:

a portion of the wand or dispensing nozzle that is rotatable about the axis of the nozzle inlet; and a bend at the nozzle outlet to a nozzle outlet angle such that the nozzle outlet is directed substantially perpendicular to a painted surface when the bead applicator is in use, and such that the dispensing nozzle can be turned to blow substantially tangentially to the painted surface.

2. The bead applicator of claim 1, further comprising:

a flexible hose included in the series of connected pipes; the flexible hose having approximately the same, or greater, inside cross-sectional area relative to that of the venturi tube outlet.

3. The bead applicator of claim 1 wherein:

the nozzle outlet angle is about 30 degrees relative to the axis of the nozzle inlet.

4. The bead applicator of claim 1, further comprising:

a particulate flow controller built into the tubular particulate supply line.

* * * * *